UNITED STATES PATENT OFFICE.

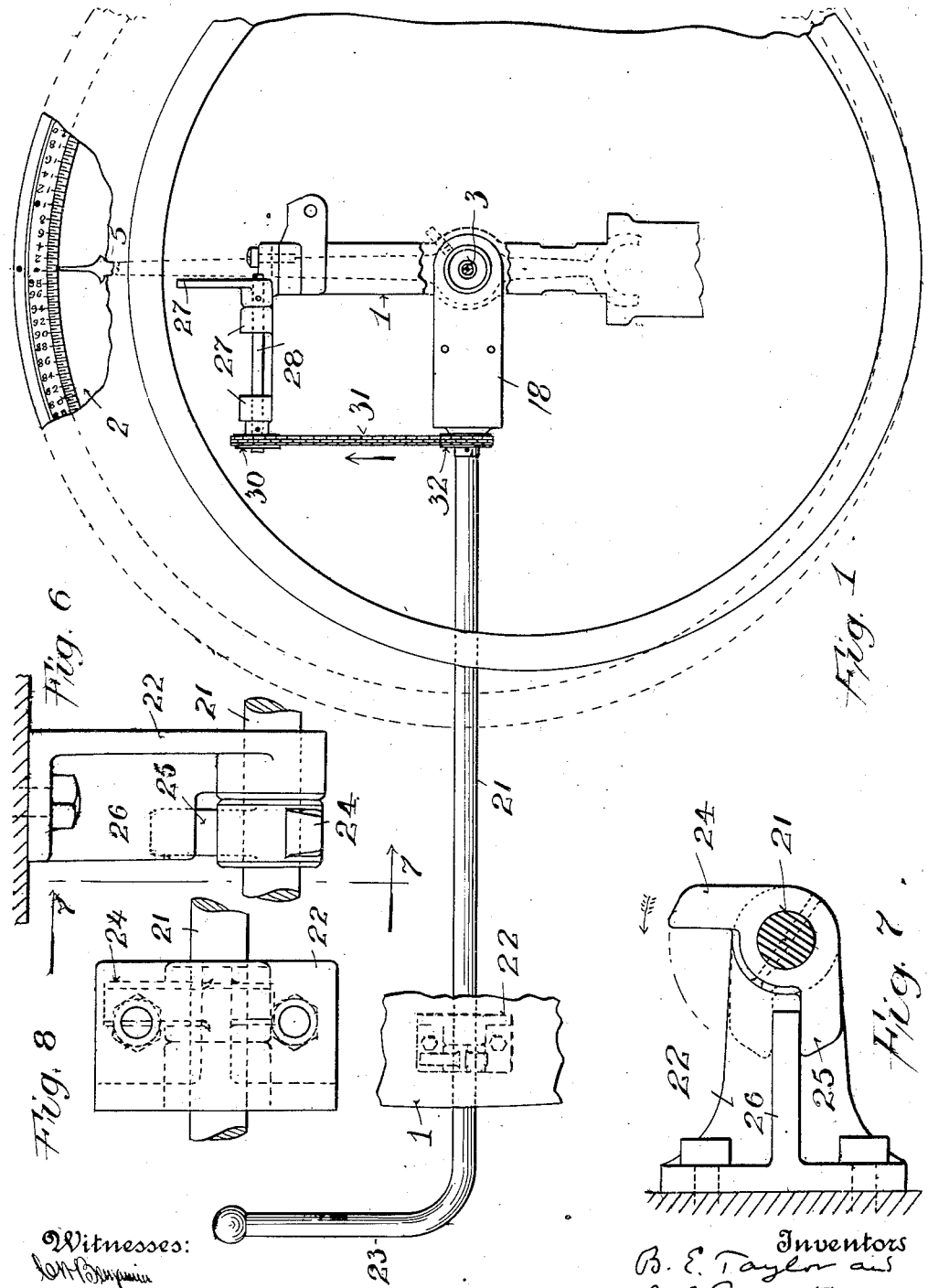

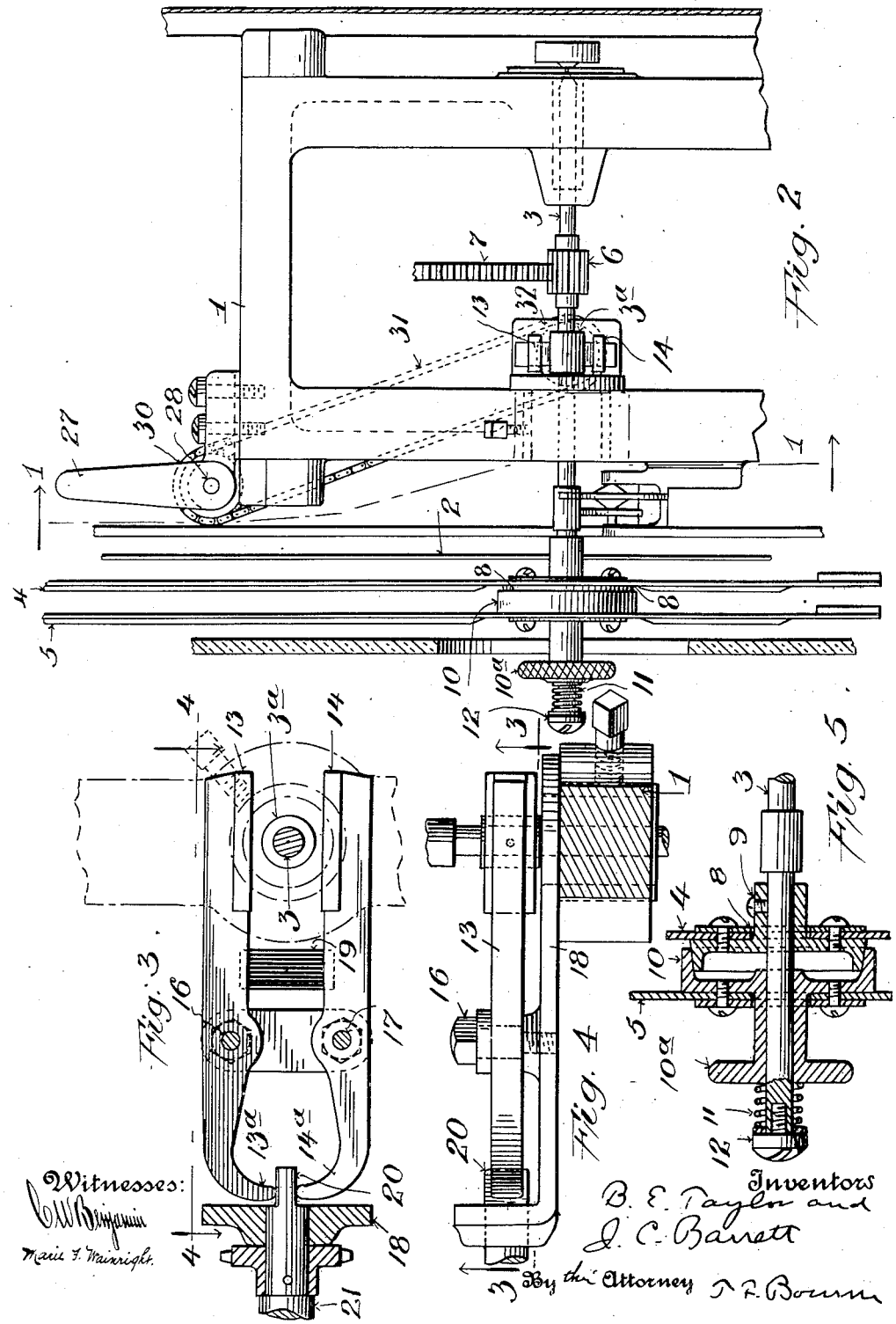

BURT E. TAYLOR AND JOSEPH C. BARRETT, OF NEW YORK, N. Y., ASSIGNORS TO AMERICAN KRON SCALE COMPANY, OF NEW YORK, N. Y., A CORPORATION OF NEW YORK.

MEASURING INSTRUMENT.

1,201,000.  Specification of Letters Patent.  Patented Oct. 10, 1916.

Application filed October 28, 1914. Serial No. 868,927.

*To all whom it may concern:*

Be it known that we, BURT E. TAYLOR and JOSEPH C. BARRETT, citizens of the United States, and residents of New York city, borough of Manhattan, county and State of New York, and New York city, borough of Brooklyn, county of Kings, and State of New York, respectively, have invented certain new and useful Improvements in Measuring Instruments, of which the following is a specification.

The object of this invention is to provide improved means to enable the accumulated weight of articles successively weighed and left on the measuring instrument or weighing scale to be indicated, and also to indicate the individual weight of any article as it is being weighed, the improvements being equally applicable to indicating the weight of articles separately regardless of the accumulated weight of several articles.

This invention comprises novel details of improvements and combinations of parts that will be more fully hereinafter set forth and then pointed out in the claims.

Reference is to be had to the accompanying drawings forming part hereof, wherein, Figure 1 is a partly broken front elevation of a portion of a weighing scale embodying this invention, taken substantially on the line 1, 1, in Fig. 2; Fig. 2 is an enlarged vertical section through Fig. 1; Fig. 3 is an enlarged detail view, substantially on the line 3, 3, in Fig. 4, illustrating devices for holding the pointer or index-shaft stationary when desired; Fig. 4 is a horizontal section substantially on the line 4, 4, in Fig. 3; Fig. 5 is a detail section of the pointer-gripping devices on the shaft of the pointers; Fig. 6 is a detail of controlling devices hereinafter referred to, looking from the rear of the machine; Fig. 7 is a section on the line 7, 7, in Fig. 6, and Fig. 8 is a view looking from the top of Fig. 6.

Similar numerals of reference indicate corresponding parts in the several views.

In the accompanying drawings the numeral 1 indicates a portion of the frame of a measuring instrument or weighing scale, and at 2 is an indicating dial, which parts may be arranged in any well known manner, having divisions to suit the scale.

At 3 is a shaft journaled in frame 1 and carrying pointers or index arms 4, 5, to sweep in front of the face of dial 2 in a usual manner. Shaft 3 may be rotated from the platform, pan or the like of the scale in any suitable manner, as by means of a pinion 6 upon said shaft actuated by the rack or gear 7 contained within the weighing mechanism, (not shown). One of the pointers or index hands, as 4, is secured to shaft 3, and the other pointer is mounted on said shaft for independent setting relatively to the dial. Pointer 4 is shown secured to a clutch member 8 that is secured upon shaft 3 by screw 9, which member serves in conjunction with the complemental clutch member 10 in the nature of a friction clutch. The pointer 5 is secured to member 10, and said member is slidably mounted upon shaft 3, being shown provided with a finger piece 10$^a$. A spring 11, shown coiled upon shaft 3 and bearing at one end against member 10 and at the other end against a stop or screw 12 on said shaft, serves to normally cause the members 8 and 10 to frictionally engage, whereby the pointers 4 and 5 will be rotated coextensively and together with shaft 3.

The arrangement described is such that both pointers may be set at zero and normally connected by friction clutch 8, 10, so that when a weight is to be weighed upon the scale both of the pointers 4 and 5 will move together along the dial. If several articles are to be weighed successively, (the weighed articles remaining upon the scale platform, pan or the like), the first of the articles will be indicated by both hands, which will start from zero, and then while such article remains upon the scale the member 10 is pulled out to release it from the member 8, the pointer 5 is returned to zero, and the pointer 4 remains at the point upon the dial indicating the weight of such article, and members 8, 10 are again engaged. Another article is then placed upon the scale, and both pointers will move forwardly together a distance corresponding to the weight of such article. Pointer 5 then indicates individually the weight of such article because said pointer starts from zero, and the pointer 4 indicates the accumulated weight of the two articles, because it advances from the point on the dial indicating the weight of the first named article which is still on the scale. If another article is to be weighed with the said two articles still on the scale, the clutch member 10 is pulled out, pointer 5 is again returned to zero, and then such article is applied upon the scale, the pointer 5 thereupon indicating the individual weight of such article and the pointer 4 indicating the accumulated weight of the three articles, and so on.

In order to retain the pointer 4 positively at the point to which it is advanced by any article placed upon the scale platform or pan, so that said pointer will not be moved back toward zero when the pointer 5 is reset to zero, means are provided for gripping shaft 3 temporarily. To this end a pair of grippers 13, 14, are shown disposed on opposite sides of shaft 3 in position to grasp said shaft, or an enlargement 3ª thereon, said grippers being shown in the nature of opposing arms pivotally supported between their ends at 16, 17, upon a portion of frame 1, as upon an extension 18 thereon, a spring 19 (Fig. 3) interposed between said arms normally serving to keep the gripping members spaced from shaft 3. The ends of grippers 13, 14 at a distance from shaft 3 are shown extended inwardly or near each other at 13ª, 14ª, and between said ends of said members is a gripper-actuating member 20, the operative portion of which is longer than wide (Figs. 3 and 4), so that when in the position shown in Figs. 1 and 2 the grippers will be retracted from shaft 3, but when said part 20 is rotated, say one-quarter turn, the members 13 and 14 will be operated to grip shaft 3. The member 20 is carried by or formed on shaft 21, said parts being mounted in bearings or brackets 22 that are carried by the scale frame, said shaft being shown provided with a handle or the like 23 for rocking it. The action of spring 19 on member 20 (through the parts 13, 14) will be such as to normally maintain handle 23 in position for operation. Shaft 21 is shown provided with stops or fingers 24, 25 adapted to engage an abutment 26 on bracket 22, to limit the rotation of said shaft in opposite directions.

In order to provide means to stop the pointer 5, at zero when it is set back to such point, and to permit said pointers to rotate freely past the zero point when necessary, a stop is provided for said pointers, which is normally held out of the path of the pointers. Said stop is indicated at 27, and is shown in the form of a finger or projection extending from a shaft 28 that is journaled in suitable bearings 29 carried by frame 1, said shaft being shown geared to shaft 21. For this purpose a sprocket wheel 30 is shown secured upon shaft 28 and receives a chain 31 from a sprocket 32 on shaft 21. The position of stop 27 with respect to the normal inoperative position of the handle 23 is such that, when handle 23 is moved to cause the members 13 and 14 to release shaft 3, stop 27 will be turned back out of the path of pointers 4, 5, as indicated in Figs. 1 and 2, and when handle 23 is swung to rotate shaft 21 to cause its member 20 to operate members 13, 14 to cause them to grip shaft 3, the stop 27 will be swung into the path of the pointers. By this means when shaft 3 is gripped by the members 13, 14, pointer 5 may be returned to zero to stop against stop 27, and pointer 4 will not be disturbed. Then when handle 23 is swung back to normal to release shaft 3, stop 27 will be moved away from the path of the pointers, and so on. By this means the movable stop 27 for the pointers is normally maintained out of position not to injure the pointers should they be suddenly caused to pass the zero point.

It will be understood, of course, that if articles are to be weighed individually without regard to the accumulated weight of successively weighed articles, both pointers 4, 5, may remain frictionally united and will sweep in front of the dial together in the manner of a single pointer.

This invention is also adapted to indicate, on the dial, at one time, the net weight of the article, as well as the gross weight of the article with the known tare. This may be done by setting pointer 5 behind zero to the point on the dial representing the known tare and then causing the two pointers to be frictionally engaged, and thereupon when the article to be weighed with the tare is placed upon the platform or pan both pointers will move equally and together, pointer 4 then indicating the gross weight and pointer 5 indicating the net weight of the article, by passing in the correct direction beyond zero an amount equal to the article only, the difference between the two pointers showing the tare. The tare and the gross weight may be ascertained by first placing the tare upon the platform or pan and allowing both pointers to advance along the dial, then returning pointer 5 to zero, leaving pointer 4 as set by the weight of the tare. If tare is now removed from the scale both pointers will travel backward, pointer 4 stopping at zero and pointer 5 passing back of zero, but retaining its relation to pointer 5 according to said tare. By now placing the article in or with said tare upon the platform or pan both pointers will move together, pointer 4 indicating the gross load and pointer 5 indicating the net weight of the article. Again, if the tare is to be left on the scale to be weighed with the article, the pointer 5 is first returned to zero, then the article 5 is applied on the scale, and both pointers will advance, the pointer 4 indicating the gross weight and the pointer 5 indicating the net weight of the article, the difference on the dial between the pointers indicating the tare.

Changes may be made in the details of construction and arrangements of parts shown and described, as the same may be varied, within the scope of the appended claims, without departing from the spirit of this invention.

Having now described our invention what we claim is:—

1. A measuring instrument comprising a stationary indicator, a plurality of movable indicators, means to move the last named indicators together, means whereby one of the movable indicators may be adjusted independently of the other, and means to retain the last named indicator when the other indicator is adjusted.

2. A measuring instrument comprising a shaft, a member secured thereto and having friction means, a pointer secured to said shaft, another member mounted loosely with respect to said shaft and having friction means to engage the first named friction means, a pointer secured to said second named member, and means to maintain said members in operative relation.

3. A measuring instrument comprising a shaft, a member secured thereto and having friction means, a pointer secured to said shaft, another member mounted loosely with respect to said shaft and having friction means to engage the first named friction means, a pointer secured to said second named member, and a spring operative upon the last named member to normally hold said members in frictional engagement.

4. A measuring instrument having a shaft, a plurality of pointers, means to cause said pointers to move together with said shaft, means to permit one of said pointers to be adjusted independently of the other pointer, and means to retain the last named pointer from rotation to enable the other pointer to be adjusted relatively thereto.

5. A measuring instrument having a shaft, a plurality of pointers, means to cause said pointers to move together with said shaft, means to permit one of said pointers to be adjusted independently of the other pointer, a pair of gripping members to restrain said shaft from movement, and means for operating said members at will.

6. A measuring instrument having a shaft, a plurality of pointers, means to cause said pointers to move together with said shaft, means to permit one of said pointers to be adjusted independently of the other pointer, a pair of gripping members to restrain said shaft from movement, means for pivotally supporting said members, a spring normally separating said members, and an actuating member for causing said gripping members to restrain the shaft.

7. A measuring instrument having a shaft, a plurality of pointers, means to cause said pointers to move together with said shaft, means to permit one of said pointers to be adjusted independently of the other pointer, a pair of gripping members to restrain said shaft from movement, means for pivotally supporting said members, a spring normally separating said members, and an actuating member nger than wide to spread the adjacent ends of said gripping members to cause the latter to restrain said shaft.

8. A measuring instrument having a shaft, a plurality of pointers, means to cause said pointers to move together with said shaft, means to permit one of said pointers to be adjusted independently of the other pointer, a pair of gripping members to restrain said shaft from movement, means for pivotally supporting said members, a spring normally separating said members, an actuating member longer than wide to spread the adjacent ends of said gripping members to cause the latter to restrain said shaft, and a shaft carrying said spreading member, said shaft having a handle and stops to limit its motion in opposite directions.

9. A measuring instrument having a shaft, a plurality of pointers, means to cause said pointers to move together with said shaft, means to permit one of said pointers to be adjusted independently of the other pointer, a movable stop normally out of the path of said pointers, and means to move said stop into the path of said pointers at will.

10. A measuring instrument having a shaft, a plurality of pointers, means to cause said pointers to move together with said shaft, means to permit one of said pointers to be adjusted independently of the other pointer, a movable stop normally out of the path of said pointers, a shaft, and gearing connecting said shaft with said stop for moving the same into and out of the path of said pointers.

11. A measuring instrument comprising a shaft, a dial, a pointer operative by said shaft, a movable stop normally out of the path of said pointer, and means to place said stop in the path of said pointer at will.

12. A measuring instrument having a shaft, a plurality of pointers, means to cause said pointers to move together with said shaft, means to permit one of said pointers to be adjusted independently of the other pointer, means to restrain said shaft from movement while one of said pointers is being restored to zero, a movable stop normally out of the path of said pointers, and means operated with said restraining means to move said stop into the path of the pointers when the restraining means restrains the shaft.

13. A measuring instrument having a shaft, a plurality of pointers, means to cause said pointers to move together with said shaft, means to permit one of said pointers to be adjusted independently of the other pointer, means to grip said shaft, a shaft to operate said means, a movable stop normally out of the path of said pointers, and gearing between said shaft and said stop for moving the same into the path of the pointers when the shaft is gripped.

14. A measuring instrument having a shaft, a plurality of pointers, means to cause said pointers to move together with said shaft, means to permit one of said pointers to be adjusted independently of the other pointer, means to grip said shaft, a shaft to operate said means, a toothed wheel carried by said shaft, a movable stop, a toothed wheel connected with said stop, and a chain passing over said wheels.

BURT E. TAYLOR.
JOS. C. BARRETT.

Witnesses:
T. F. BOURNE,
MARIE WAINRIGHT.